US009241101B2

(12) United States Patent
Marino et al.

(10) Patent No.: US 9,241,101 B2
(45) Date of Patent: Jan. 19, 2016

(54) DIGITAL CAMERA USER INTERFACE FOR TEXT ENTRY

(75) Inventors: Frank Marino, Rochester, NY (US); Alison Rose Boncha, San Francisco, CA (US); Noah Joseph Stupak, Rochester, NY (US); Keith Stoll Karn, Avon, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 894 days.

(21) Appl. No.: 13/100,472

(22) Filed: May 4, 2011

(65) Prior Publication Data

US 2012/0281127 A1 Nov. 8, 2012

(51) Int. Cl.
H04N 5/232 (2006.01)
G06F 3/023 (2006.01)
G11B 27/034 (2006.01)
G11B 27/34 (2006.01)

(52) U.S. Cl.
CPC .......... *H04N 5/23229* (2013.01); *G06F 3/0236* (2013.01); *G11B 27/034* (2013.01); *G11B 27/34* (2013.01)

(58) Field of Classification Search
CPC .......... H04N 5/23229; H04N 21/4828; H04N 21/4312; G11B 27/34; G11B 27/034; G06F 3/0236; G06F 3/0239; G06F 3/0233
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,774,574 A | 9/1988 | Daly et al. |
| 5,189,511 A | 2/1993 | Parulski et al. |
| 5,493,335 A | 2/1996 | Parulski et al. |
| 5,652,621 A | 7/1997 | Adams, Jr. et al. |
| 5,668,597 A | 9/1997 | Parulski et al. |
| 5,982,350 A | 11/1999 | Hekmatpour et al. |
| 6,192,162 B1 | 2/2001 | Hamilton, Jr. et al. |
| 6,292,218 B1 | 9/2001 | Parulski et al. |
| 6,321,024 B1 | 11/2001 | Fujita et al. |
| 6,600,481 B1 | 7/2003 | Brown et al. |

(Continued)

FOREIGN PATENT DOCUMENTS

JP 07-327203 12/1995

OTHER PUBLICATIONS

Final Office Action on U.S. Appl. No. 13/100,461, mailed Sep. 10, 2013.

(Continued)

*Primary Examiner* — Luong T Nguyen

(57) ABSTRACT

A portable electronic device providing a user-specified input string, comprising: user controls enabling a user to select between at least an up input, a down input, a left input, a right input, and a confirmation input; and a program memory storing instructions configured to implement a method for providing a user-specified input string. The method includes: displaying a string input interface including a string entry section, and at least two independently scrollable character selection sections; accepting user input to sequentially select characters, wherein the up input and the down input are used to select a scrollable character selection section, the left input and the right input are used to scroll through the characters in the selected scrollable character selection section to select a particular character, and the confirmation input is used to add the selected particular character to the input string displayed in the string input section.

22 Claims, 7 Drawing Sheets

(56) References Cited

U.S. PATENT DOCUMENTS

| | | |
|---|---|---|
| 6,934,056 B2 | 8/2005 | Gindele et al. |
| 7,417,680 B2 | 8/2008 | Aoki et al. |
| 7,542,077 B2 | 6/2009 | Miki |
| 7,868,914 B2 | 1/2011 | Dengler et al. |
| 7,925,986 B2* | 4/2011 | Aravamudan ............. 715/773 |
| 2002/0085158 A1 | 7/2002 | Armagost et al. |
| 2005/0117044 A1* | 6/2005 | Suto ................. 348/333.12 |
| 2007/0013609 A1 | 1/2007 | Crow et al. |
| 2007/0024931 A1 | 2/2007 | Compton et al. |
| 2008/0222256 A1* | 9/2008 | Rosenberg et al. ........ 709/206 |
| 2008/0222567 A1 | 9/2008 | Thoresson |
| 2008/0297027 A1 | 12/2008 | Miller et al. |
| 2010/0251114 A1* | 9/2010 | Wehba et al. ............ 715/702 |
| 2011/0124354 A1* | 5/2011 | Nagata .................. 455/466 |
| 2011/0293018 A1 | 12/2011 | Deever |
| 2012/0128316 A1 | 5/2012 | Ikeda et al. |
| 2012/0198319 A1 | 8/2012 | Agnoli et al. |
| 2012/0216140 A1* | 8/2012 | Smith .................. 715/780 |

OTHER PUBLICATIONS

Non-Final Office Action on U.S. Appl. No. 13/100,461, mailed Oct. 24, 2012.

Non-Final Office Action on U.S. Appl. No. 13/100,4681, mailed Mar. 26, 2013.

Non-Final Office Action on U.S. Appl. No. 13/100,461, mailed Feb. 12, 2014.

Final Office Action on U.S. Appl. No. 13/100,461, mailed Aug. 26, 2014.

* cited by examiner

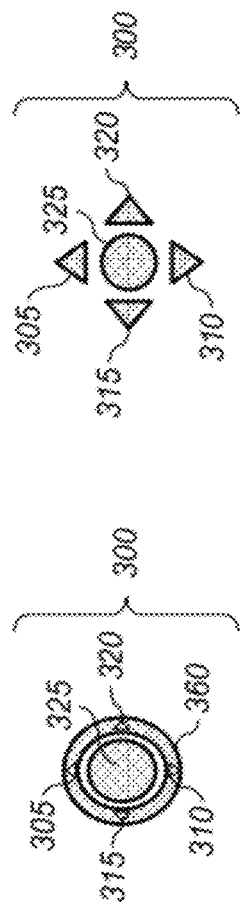
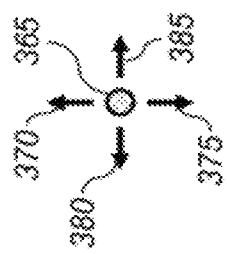
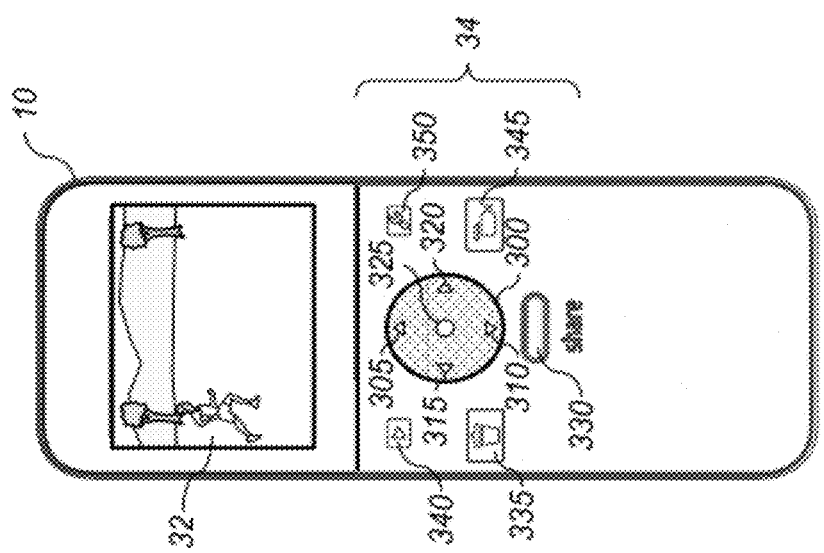
FIG. 3A
FIG. 3B
FIG. 3C
FIG. 3D

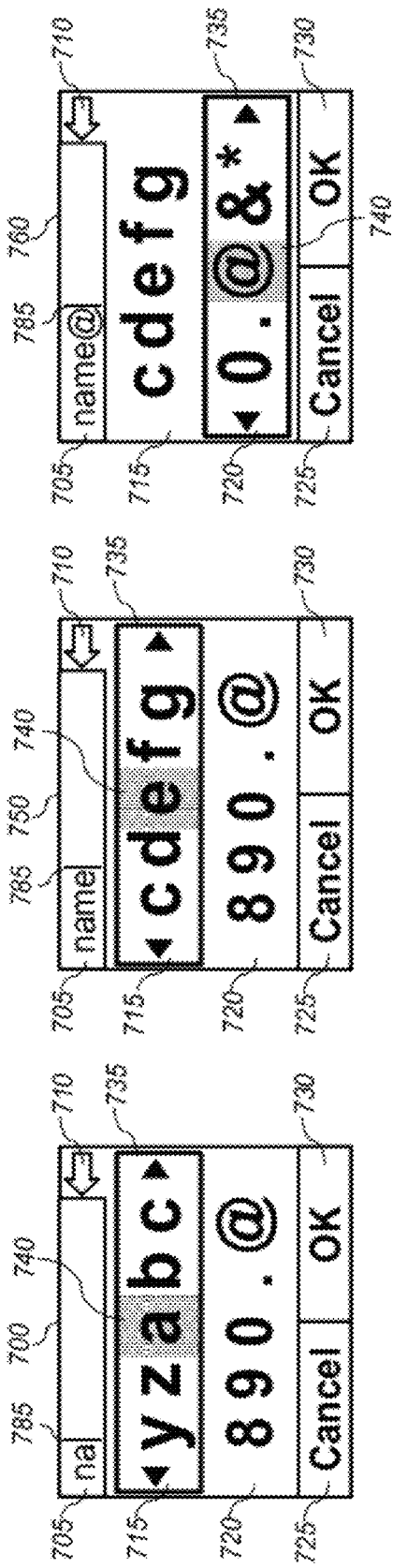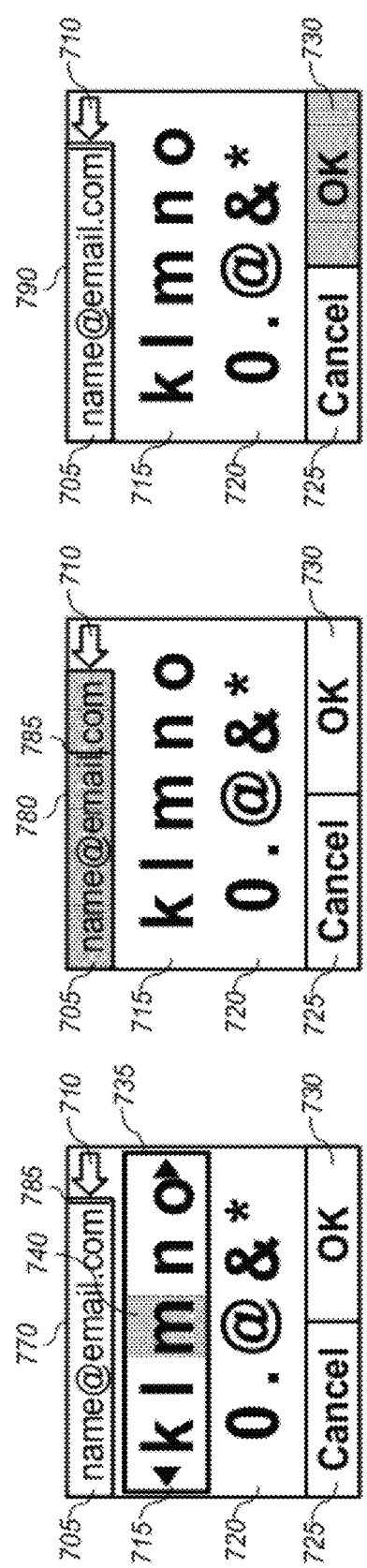

DIGITAL CAMERA USER INTERFACE FOR TEXT ENTRY

CROSS-REFERENCE TO RELATED APPLICATIONS

Reference is made to commonly-assigned, co-pending U.S. patent application Ser. No. 13/100,461, entitled "Digital camera user interface for video trimming", by Boncha et al., which is incorporated herein by reference.

FIELD OF THE INVENTION

This invention pertains to the field of digital cameras, and more particularly to a digital camera having a user interface which uses a small display screen.

BACKGROUND OF THE INVENTION

Digital cameras typically include a graphic user interface (GUI) to enable various camera modes and features to be selected. In some digital cameras, a touch-screen color LCD display is used to display various control elements which can be selected by a user in order to modify the camera mode or select various camera features. For example, the KODAK SLICE Digital Camera can provide a video trimming feature which enables videos captured by the digital camera to be shortened. This is accomplished using the camera's 3.5 inch diagonal touch screen user interface to first select a trimming mode by touching an icon associated with the trimming feature, and then sliding a finger along a timeline to select a start frame, and to then select an end frame.

The KODAK SLICE Digital Camera's touch screen user interface can also be used to enter text, such as e-mail addresses and tags. This is accomplished by first selecting a text entry mode, which displays an entire keyboard of characters, and then touching the keyboard characters in order to enter a text string.

It is desirable for the digital camera to be very compact and low cost. This may limit the size of the LCD display that can be used in such digital cameras. Also, in some cases it is desirable to provide a camera capable of underwater operation. This may require that the user interface be provided using a small number of waterproof buttons or switches, rather than a touch screen, since the touch screen may not operate properly underwater.

U.S. Pat. No. 5,982,350 to Hekmatpour et al., entitled "Compositer interface for arranging the components of special effects for a motion picture production," discloses a user interface for editing digital video sequences. The user interface provides various functions including a capability to trim a digital video sequence. The user interface requires the use of a pointing device such as a mouse, and would not be appropriate for use on a digital camera.

U.S. Pat. No. 6,600,481 to Brown et al., entitled "Data entry apparatus and method," discloses a method for entering text strings on portable electronic devices such as pagers. A set of available characters are displayed in three rows. A controller having an up tab, a down tab, a left tab and a right tab are used to select a particular character for insertion into the text string. This method is not well-suited for use on devices having small displays because the entire row of characters must be presented on the display.

There remains a need to provide a user interface using a limited size image display, and a limited number of user controls, which can nevertheless provide for advanced functions, including video trimming and text entry.

SUMMARY OF THE INVENTION

The present invention represents a portable electronic device providing a user-specified input string, comprising:
a display;
user controls enabling a user to select between at least an up input, a down input, a left input, a right input, and a confirmation input;
a storage memory;
a data processing system; and
a program memory communicatively connected to the data processing system and storing instructions configured to cause the data processing system to implement a method for providing a user-specified input string, wherein the method includes:
  initiating a string input operation;
  displaying a string input interface on the display, wherein the string input interface includes:
    a string entry section for displaying the user-specified input string;
    at least two independently scrollable character selection sections, each character selection section enabling a user to select from a corresponding predefined set of characters, wherein only a subset of the corresponding predefined set of characters are displayed in each of the character selection sections at a particular time;
  accepting user input provided using the user controls to sequentially select characters to specify the input string, wherein the up input and the down input are used to select one of the scrollable character selection sections, the left input and the right input are used to scroll through the predefined set of characters in the selected scrollable character selection section to select a particular character, and the confirmation input is used to add the selected particular character to the input string displayed in the string input section;
  accepting user input to terminate the string input operation; and
  storing the input string in the storage memory.

The present invention has the advantage that a text entry operation can be performed on a portable electronic device having a small display and a very limited number of user controls.

It has the additional advantage that the provided user interface is user friendly and intuitive despite the limited functionality of the user controls It has the further advantage that the user interface does not require the use of a touch-sensitive display.

BRIEF DESCRIPTION OF THE DRAWINGS

FIG. 3A is a diagram illustrating one embodiment of a back of a digital camera according to the present invention;

FIGS. 3B-3D are diagram illustrating alternate embodiments of user controls;

FIGS. 7A-7F are diagrams illustrating exemplary user interface screens for one embodiment of a text entry workflow.

Figure 1:
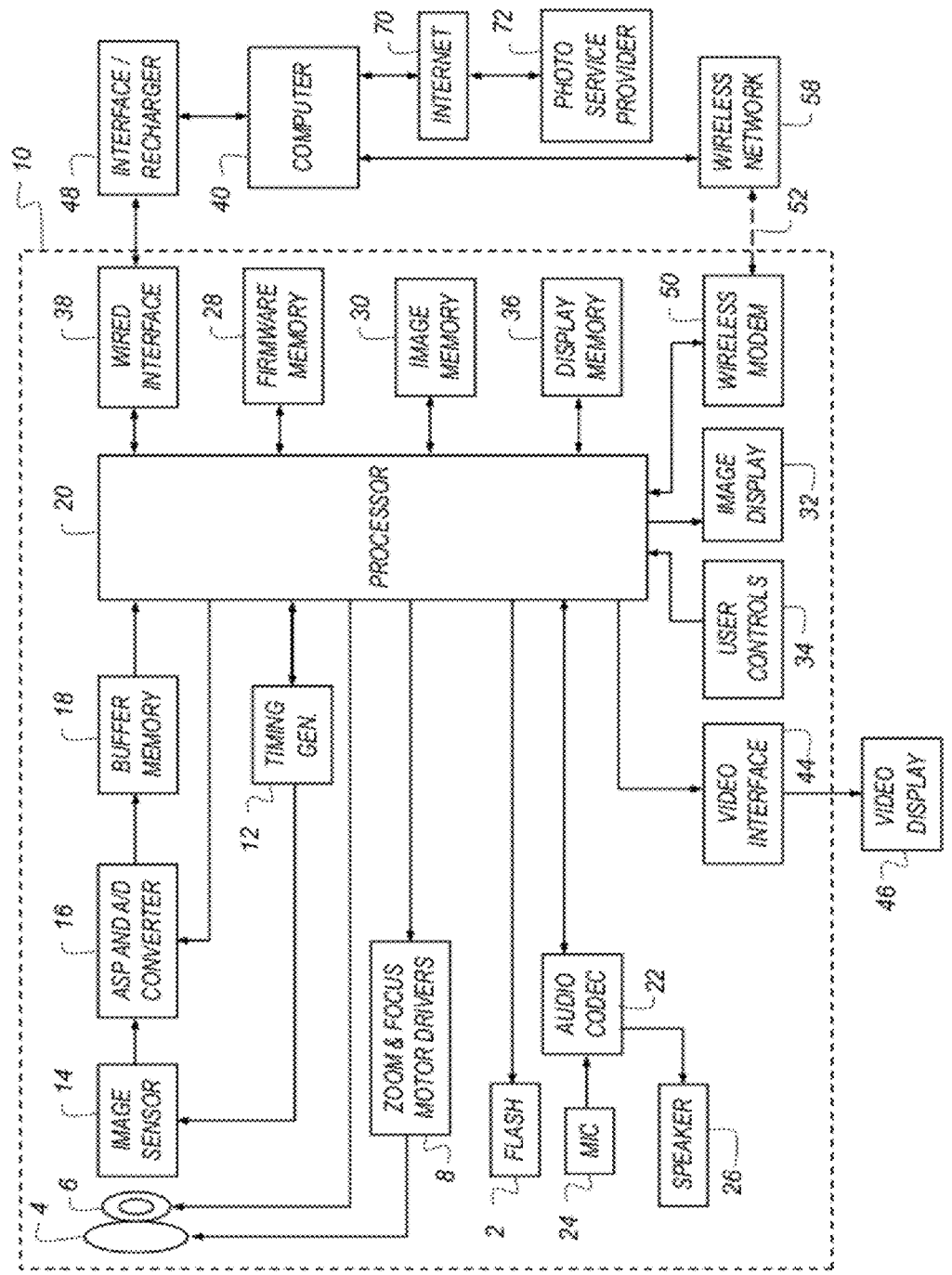
FIG. 1 is a high-level diagram showing the components of a digital camera system.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity", the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images", which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene. In some embodiments of the present invention, the flash 2 has an adjustable correlated color temperature. For example, the flash disclosed in U.S. Patent Application Publication 2008/0297027 to Miller et al., entitled "Lamp with adjustable color", can be used to produce illumination having different color balances for different environmental conditions, such as having a higher proportion of red light when the digital camera 10 is operated underwater.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 includes various user control elements which can be selected by user controls 34. The user controls 34 are used to select various camera modes, such as video capture mode, still capture mode, and review mode, and to initiate capture of still images and recording of motion images. In some embodiments, the first mode described above (i.e. still preview mode) is initiated when the user partially depresses an image capture button, which is one of the user controls 34, and the second mode (i.e., still image capture mode) is initiated when the user fully depresses the image capture button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32 having one or more touch-sensitive user control elements.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can be used for telephone conversation. In some embodiments, microphone 24 is capable of recording sounds in air and also in an underwater environment when the digital camera 10 is used to record underwater images according to the method of the present invention. In other embodiments, the digital camera 10 includes both a conventional air microphone as well as an underwater microphone (hydrophone) capable of recording underwater sounds.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

In some embodiments, the digital camera 10 is a water proof digital camera capable of being used to capture digital images underwater and under other challenging environmental conditions, such as in rain or snow conditions. For example, the digital camera 10 can be used by scuba divers exploring a coral reef or by children playing at a beach. To prevent damage to the various camera components, the digital camera 10 includes a watertight housing (not shown).

Figure 2:
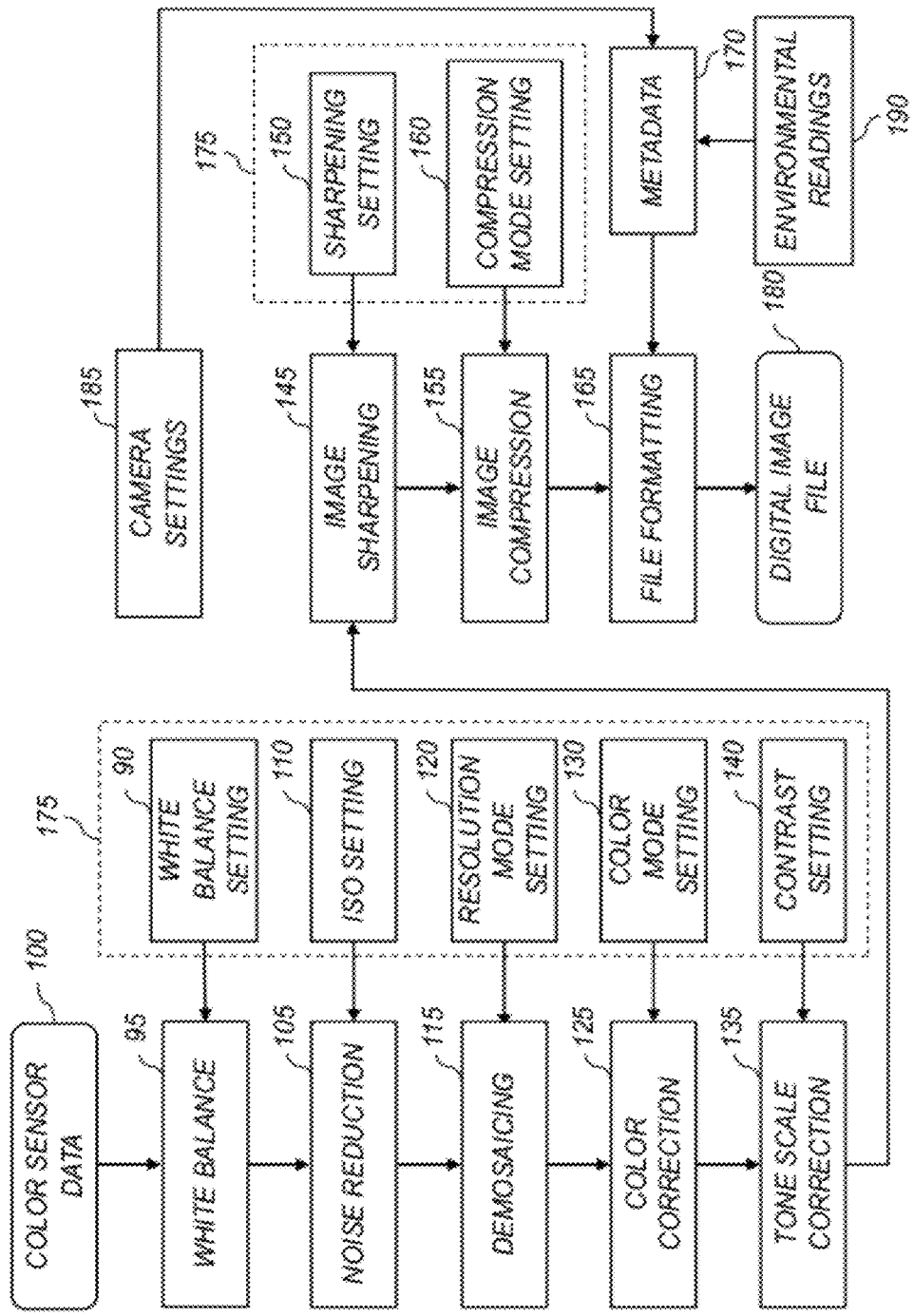
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various user settings 175, which are typically associated with photography modes that can be selected via the user controls 34, which enable the user to adjust various camera settings 185 in response to menus displayed on the image display 32. In a preferred embodiment, the user control elements available in the menus are adjusted responsive to sensed environmental conditions.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or can be automatically set to different values when the camera is used in different environmental conditions, as will be described later in reference to FIG. 4.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel", the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera", to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size", to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (Normal Color Reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (Saturated Color Reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (De-Saturated Color Reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (Monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

Setting 5 (Nominal Underwater Color Reproduction)

$$\begin{bmatrix} R_{out} \\ G_{out} \\ B_{out} \end{bmatrix} = \begin{bmatrix} 3.00 & -0.30 & -0.20 \\ -0.80 & 1.80 & -0.40 \\ -0.40 & -0.20 & 1.40 \end{bmatrix} \begin{bmatrix} R_{in} \\ G_{in} \\ B_{in} \end{bmatrix} \quad (5)$$

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10. In some embodiments, different image sharpening algorithms can be manually or automatically selected, depending on the environmental condition.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and F/# of the lens, and whether or not the camera flash fired. In some embodiments, the metadata 170 can also include one or more environmental readings 190 provided by appropriate environmental sensors associated with the digital camera 10. For example, an underwater sensor (not shown) can be used to provide an environmental reading indicating whether the digital camera 10 is being operated underwater. Similarly, a Global Positioning System (GPS) sensor (not shown) can be used to provide an environmental reading indicating a geographical location, or an inertial motion sensor such as a gyroscope or an accelerometer can be used to provide an environmental reading indicating a camera motion or orientation. In a preferred embodiment, all of this metadata 170 is stored using standardized tags within the well-known Exif-JPEG still image file format.

In accordance with the present invention, there are provided methods to perform a number of user interface tasks on a device having a small image display 32 using a minimal set of user controls. While there have been many different user interfaces for digital cameras and other portable electronic devices that have been disclosed in the prior art, they are typically designed to work with devices that have large image displays 32 and a large number of different buttons or touch activated controls. However, such components add significant cost to the device. Therefore, to produce low-cost devices, there is a desire to minimize the size of the display and the number of user controls. However, this has presented significant challenges relative to designing user interfaces that allow users to perform some common tasks in an intuitive and efficient fashion. The present invention is directed to solutions to this problem for several important tasks. Specifically, user interface methods are described for performing video trimming operations and text string entry operations. These methods are particularly well-suited for image displays 32 that are not touch-sensitive and have a diagonal dimension of less than 2 inches, although they can also be employed for touch sensitive displays and larger displays.

FIG. 3A is a diagram showing a rear view of the digital camera 10 according to one exemplary embodiment. The digital camera includes an image display 32, as well as various user controls 34. According to a preferred embodiment, the user controls 34 include a set of five inputs: an up input, a down input, a left input, a right input, and a confirmation input. In the exemplary embodiment of FIG. 3A, these controls are provided by a five-way controller 300. The five-way controller 300 includes five buttons: an up input button 305, a down input button 310, a left input button 315, a right input button 320, and a confirmation input button 325. The digital camera 10 can also include any other user controls that are known in the art. In the embodiment of FIG. 3A, the user controls 34 also include a share button 330, a delete button 335, a review button 340, capture mode button 345, and a tools button 350.

In the embodiment of FIG. 3A the five-way controller 300 is a solid circular disk, wherein each of the buttons are activated by pressing on an appropriate location on the circular disk. In other embodiments, the five-way controller 300 can include a controller ring 360 surrounding a separate confirmation input button 325 as is illustrated in FIG. 3B. In this configuration, the controller ring 360 provides the up input button 305, the down input button 310, the left input button 315 and the right input button 320, which are activated by pressing on the corresponding side of the controller ring 360.

In other embodiments, the five inputs (i.e., the up input, the down input, the left input, the right input, and the confirmation input) can be provided by other types of user controls 34 that are well-known in the art. For example, FIG. 3C shows a configuration where the five inputs are provided by five individual buttons (i.e., up input button 305, down input button 310, left input button 315, right input button 320, and confirmation input button 325). Similarly, FIG. 3D shows another configuration where the five inputs are provided by a joy stick 365. The joy stick 365 can be pushed in an up direction 370 to provide the up input, in a down direction 375 to provide the down input, in a left direction 380 to provide the left input, and in a right direction 385 to provide the right input. The confirmation input can be provided by pressing on the end of the joy stick 365, or alternately by a separate confirmation input button (not shown).

A method for providing a user interface on a digital camera 10 for trimming a captured digital video sequence will now be described with reference to FIG. 4. The method is provided on a digital camera 10 (FIG. 3A) having video image capture capabilities, which has been used to capture one or more digital video sequences. The method is particularly suitable for use with digital cameras 10 using image displays 32 having a relatively small size.

A select captured video step 400 is used to select a previously captured digital video sequence 405. The select captured video step 400 can be performed using any convenient user controls known in the art. In some embodiments, the user can perform this step by entering a review mode using the review button 340 (FIG. 3A). The user can then use the user controls 34 to select a particular digital video sequence 405. For example, the left input button 315 and the right input button 320 can be used to sequence through the previously captured digital still images and digital video sequences that are stored in the image memory 30 (FIG. 1). When the desired digital video sequence 405 has been located, the confirmation input button 325 can be used to select it.

Once a particular digital video sequence 405 has been selected, the user can perform various actions. For example, the selected digital video sequence 405 can be played, or it can be edited. One type of video editing operation that can be performed in accordance with the present invention is a video trimming operation, in which the user can trim one or both ends of the selected digital video sequence 405 to provide a shorter trimmed digital video sequence 440 containing only a portion of the selected digital video sequence. For example, the user may desire to trim the selected digital video sequence 405 to include only the most interesting portion. The video trimming operation involves selecting a start frame and an end frame, designating the portion of the selected digital video sequence 405 to be included in the trimmed digital video sequence 440.

An initiate trimming operation step 410 is used to initiate the video trimming operation. The initiate trimming operation step 410 can be performed using any convenient user controls known in the art. For example, once the particular digital video sequence 405 has been selected with the select captured video step 400, the first frame of the selected digital video sequence 405 can be displayed on the image display 32 (FIG. 3A). In a preferred embodiment, if the user presses the confirmation input button, the selected digital video sequence 405 is played, and if the user presses the tools button 350 a menu of available editing operations is displayed. The user can then select the video trimming operation using the up input button 305 and the down input button 310. The video trimming operation can then be initiated by pressing the confirmation input button 325. It will be obvious to one skilled in the art that a wide variety of different user interface configurations can be used to perform the initiate trimming operation step 410 according to various embodiments.

Figure 5A:
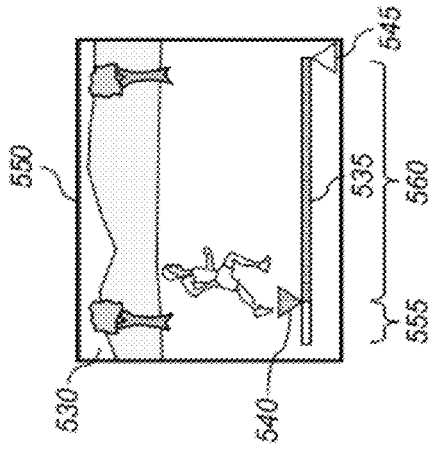
FIGS. 5A-5F are diagrams illustrating exemplary user interface screens for one embodiment of a video trimming workflow.

Next, an optional display instructions step 415 is used to display an instructions screen on the image display 32 (FIG. 3A), providing the user with information that will be helpful for understanding the behavior of the user interface during the video trimming operation. In a preferred embodiment, the instructions screen includes an indication of the function of appropriate user controls 34 (FIG. 3A) during the video trimming operation. An example of a user interface screen 500 that can be displayed by the display instructions step 415 is shown in FIG. 5A. Select marker instructions 505 provide an indication that the up input and the down input can be used to select between a start frame marker and an end frame marker. Move marker instructions 510 provide an indication that the left input and the right input can be used to move the selected frame marker. Next instructions 515 provide an indication that the confirmation input can be used to advance to the next step in the trimming operation. An OK control 520 provides an indication that the user should activate the confirmation input when he is done looking at the user interface screen 500.

Figure 4:
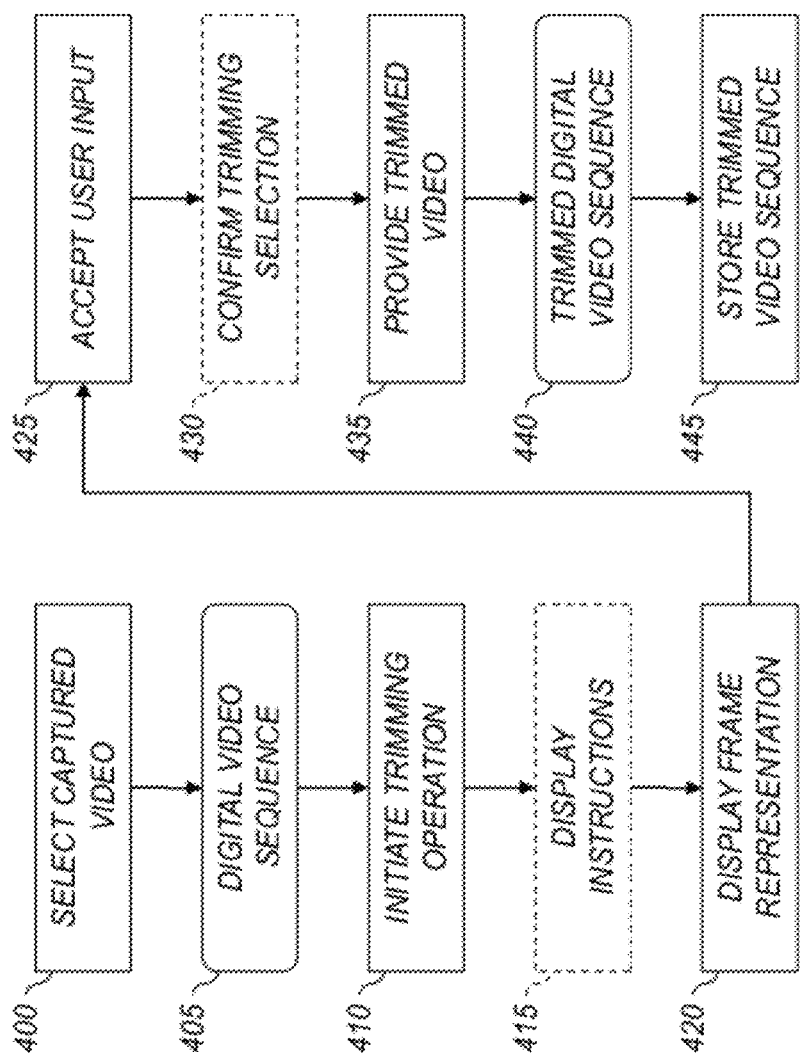
FIG. 4 is a flowchart showing steps for providing a digital camera user interface for a video trimming operation.

Returning to a discussion of FIG. 4, a display frame representation step 420 is used to display a representation of a frame from the selected digital video sequence 405 on the image display 32 (FIG. 3A), together with appropriate user interface elements. In a preferred embodiment, the displayed frame that is initially displayed is the first frame in the selected digital video sequence 405.

Figure 5B:
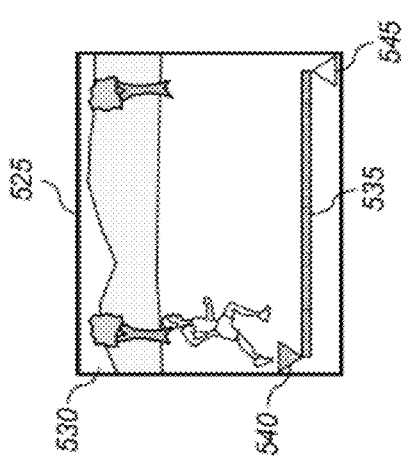

FIG. 5B shows an example of a user interface screen 525 showing a displayed video frame 530 corresponding to the first frame of the selected digital video sequence 405 (FIG. 4). A timeline 535 represents the time interval of the selected digital video sequence 405. A start frame marker 540 indicates the start frame for the trimmed digital video sequence 440 (FIG. 4) and an end frame marker 545 indicates the end frame for the trimmed digital video sequence 440. The positions of the start frame marker 540 and the end frame marker 545 relative to the timeline 535 provides an indication of the relative position of the respective frames within the selected digital video sequence 405. At the start of the video trimming operation, the start frame marker 540 is positioned at the first frame of the selected digital video sequence 405, the end frame marker 545 is positioned at the last frame of the selected digital video sequence 405, and the entire timeline 535 is highlighted indicating that the entire digital video sequence 405 is initially included in the trimmed digital video sequence 440. Initially, the video trimming operation starts out in a start frame selection mode. Accordingly, the start frame marker 540 is highlighted indicating that it is the active frame marker.

An accept user input step 425 (FIG. 4) is used to accept input from the user to select the start frame (and also the end frame) for the trimmed digital video sequence 440 (FIG. 4). The user can use the right input button 320 (FIG. 3A) and left input button 315 (FIG. 3A) to adjust the position of the start frame marker 540 (FIG. 5B) in order to adjust the starting point for the trimmed digital video sequence 440. As the position of the start frame marker 540 is adjusted, the displayed video frame 530 (FIG. 5B) is adjusted to show the corresponding frame of the selected digital video sequence 405 (FIG. 4).

In a preferred embodiment, if the right input button 320 is held down, the start frame marker 540 advances across the timeline 535 and the displayed video frame 530 advances through the selected digital video sequence 405 at a predefined fast forward rate. In some embodiments, the predefined fast forward rate is increased if the right input button 320 is held for an extended period of time. In a preferred embodiment, if the right input button 320 is pressed and released without holding it, then the start frame marker 540 advances by a predefined number of video frames corresponding to a predefined small time interval. Similarly, the left input button 315 can be used to move the start frame marker 540 to the left, thereby moving through the selected digital video sequence in a reverse direction.

Figure 5C:
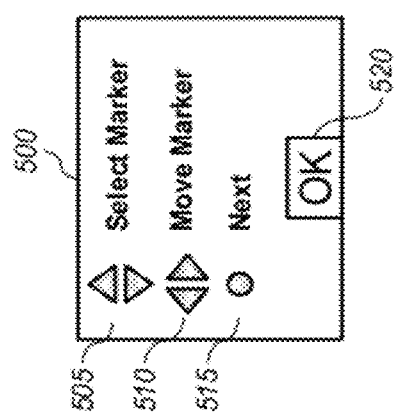

FIG. 5C shows an example of a user interface screen 550 where the position of the start frame marker 540 has been moved to the right partway across the timeline 535. The portion of the timeline between the start frame marker 540 and the end frame marker 545 is highlighted indicating a trimmed timeline portion 560. The portion of the timeline 535 to the left of the start frame marker 540 is not highlighted, indicating an excluded start timeline portion 555.

Figure 5D:
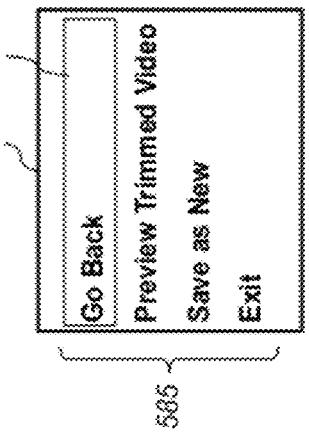

If the user now presses the up input button 305 (or the down input button 310), the mode is changed from the start frame selection mode to an end frame selection mode. This is illustrated in the user interface screen 565 of FIG. 5D, which is identical to the user interface screen 550 of FIG. 5C except that the end frame marker 545 is now highlighted rather than the start frame marker 540. (The highlighting of the corresponding frame marker provides a graphical indication of whether the user has selected the start frame selection mode or then end frame selection mode.) The displayed video frame 530 now shows the video frame corresponding to the end frame marker 545 (initially the last frame of the selected digital video sequence 405).

In the end frame selection mode, the right input button 320 (FIG. 3A) and left input button 315 (FIG. 3A) can be used to adjust the position of the end frame marker 545 in order to adjust the ending point for the trimmed digital video sequence 440. As the position of the end frame marker 545 is adjusted, the displayed video frame 530 is adjusted to show the corresponding frame of the selected digital video sequence 405. The behavior of the right input button 320 and left input button 315 in the end frame selection mode will be analogous to those described above for the start frame selection mode.

Figure 5E:
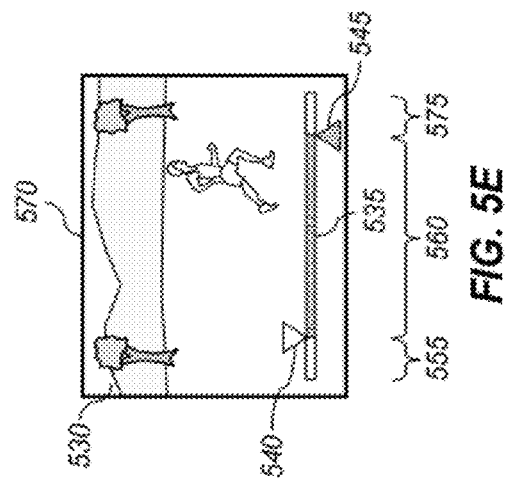

FIG. 5E shows an example of a user interface screen 570 where the position of the end frame marker 545 has been moved to the left partway across the timeline 535. As described earlier, the portion of the timeline between the start frame marker 540 and the end frame marker 545 is highlighted indicating the trimmed timeline portion 560. The portion of the timeline 535 to the right of the end frame marker 545 is not highlighted, indicating an excluded end timeline portion 575.

The up input button 305 (or the down input button 310) can be used to toggle back and forth between the start frame selection mode and the end frame selection mode. In this way, the user can fine tune the position of the start frame marker 540 and the end frame marker 545 until he/she is satisfied with the designated trimmed digital video sequence 440 (FIG. 4). At that point, the user can press the confirmation input button 325 to move to the next step in the video trimming operation.

In a preferred embodiment, pressing the confirmation input button 325 terminates the accept user input step 425 (FIG. 4) and advances the video trimming operation to the next step. In some embodiments, terminating the accept user input step 425 causes the trimmed digital video sequence 440 to be formed and stored in a processor-accessible memory. In other embodiments, it only causes an indication of the selected start frame and end frame to be stored so that they can be used at a later time to form the trimmed digital video sequence 440.

In some embodiments, if the user presses the confirmation input button 325 before they have entered the end frame selection mode using the up input button 305 or the down input button 310, then rather than advancing immediately to a confirm trimming selection step 430, the video trimming operation makes the assumption that the user will first want to enter the end frame selection mode. In this case, a second activation of the confirmation input button 325 will advance the video trimming operation to the confirm trimming selection step 430.

In a preferred embodiment, terminating the accept user input step 425 causes the video trimming process to advance to an optional confirm trimming selection step 430. In other embodiments, this step can be omitted and the video trimming process can advance directly to a provide trimmed video step 435.

Figure 5F:
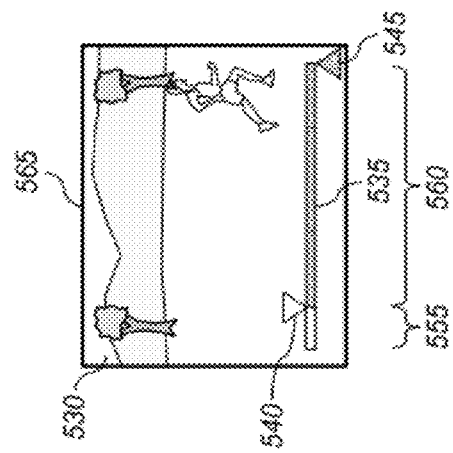

FIG. 5F shows an example of a user interface screen 580 that can be used for the confirm trimming selection step 430. The user interface screen 580 includes a set of menu choices 585, indicating the available options. A selection box 590 is positioned over the currently selected choice. The up input button 305 (FIG. 3A) and the down input button 310 (FIG. 3A) can be used to move the selection box 590 up or down through the list of menu choices 585. When the selection box 590 is over the desired choice, the user can activate that choice using the confirmation input button 325 (FIG. 3A).

The menu choices 585 include a "Go Back" choice which can be used to return to the start/end frame selection process. A "Preview Trimmed Video" choice can be used to preview the trimmed digital video sequence 440 as specified by the selected start frame and end frame. An "Exit" choice exits the video trimming operation without saving the trimmed digital video sequence 440. A "Save as New" choice causes the video trimming operation to advance to a provide trimmed video step 435 (FIG. 4), which forms the trimmed digital video sequence 440 by trimming the selected digital video sequence 405 to include the frames between the selected start frame and end frame. A store trimmed video sequence step 445 is then used to store the trimmed digital video sequence 440 in the image memory 30 (FIG. 1).

In a preferred embodiment, the trimmed digital video sequence 440 is stored as a separate digital video file, retaining both the original digital video sequence 405 and the trimmed digital video sequence 440. In other embodiments, the original digital video sequence 405 can be replaced by the trimmed digital video sequence 440, or two different options can be provided allowing the user to choose either save method (e.g., by providing both a "Save as New" choice and a "Save" choice).

In some embodiments, the digital video sequence 405 is stored in a compressed digital video file. Typically, some of the frames in a compressed digital video files are "I-frames," which are encoded using intra-frame compression that is independent of any other frames, and other frames are "P-frames" or "B-frames" that are encoded using predictions based on other nearby frames. Therefore, I-frames can be decoded without the need to decode any other frames. In some embodiments, the video trimming operation can be constrained so that the trimmed digital video sequence 440 always begins on an I-frame within the digital video sequence 405. This is advantageous relative to the processing required for the provide trimmed video step 435 and the store trimmed video sequence step 445.

In some embodiments, rather than storing the trimmed digital video sequence 440 in a digital video file, the store trimmed video sequence step 445 can store metadata associated with the original digital video sequence 405 indicating the start frame and the end frame specified for the trimmed digital video sequence 440. Then, when the digital video sequence 405 is played using a video player that knows how to interpret the metadata, it can play the trimmed digital video sequence 440 rather than the entire digital video sequence 405. In some embodiments, the metadata is stored within the digital file containing the digital video sequence 405. In other embodiments, the metadata can be stored in a separate digital file.

In some embodiments, an option can be provided to select an optional trimming mode where the trimmed digital video sequence 440 is formed by deleting the frames between the selected start frame and the selected end frame from the digital video sequence 405, rather than keeping these frames. For example, a user interface control can be provided to toggle between a "keep frames trimming mode" and a "delete frames trimming mode."

Figure 6:
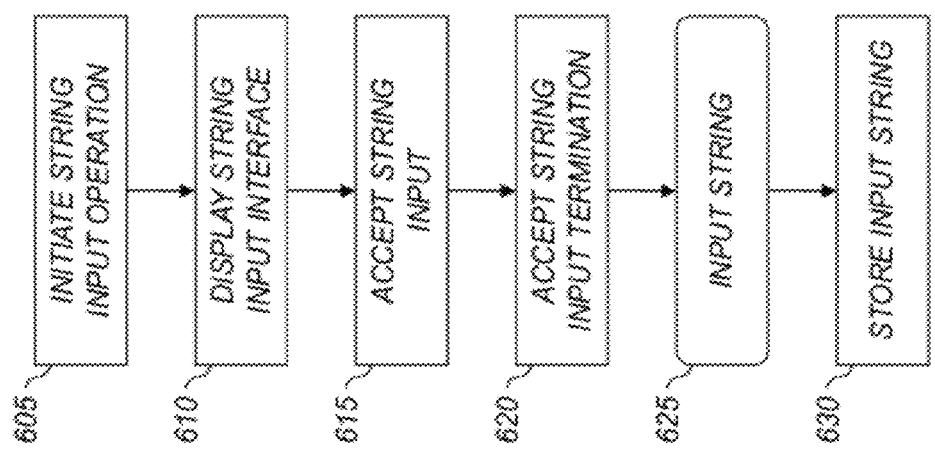
FIG. 6 is a flowchart showing steps for providing a digital camera user interface for text entry.

FIG. 6 is a flowchart of a text entry method for providing a user-specified input string for a portable electronic device. This method will be described in the context of the digital camera 10 of FIG. 3A. However, it will be obvious to one skilled in the art that it is also applicable to a wide variety of different portable electronic devices such as cell-phones and digital media players. The method is well-suited to use with devices having a relatively small display screen (e.g., having a diagonal dimension of less than 2 inches) and a limited set of user controls including an up input button 305, a down input button 310, a left input button 315, a right input button 320, and a confirmation input button 325.

There are a variety of different needs for providing user-specified input strings for a portable electronic device. For example, the digital camera 10 of FIG. 3A includes a share button 330, which can be used to designate a sharing destination for a captured digital still image or digital video sequence. The sharing destination can include an E-mail address, a social networking account identifier (e.g., a Facebook account identifier) or a website URL, each of which may require providing a user-specified input string. Other applications for user-specified input strings would include providing user-specified image captions and entering wireless networking passwords.

An initiate string input operation step 605 is executed when the user initiates an operation that requires the user to specify an input text string. For example, the user may initiate a sharing operation to an E-mail address.

Next, a display string input interface step 610 is used to display a user interface for receiving string input on the image display 32 (FIG. 3A). An example user interface screen 700 representing a preferred embodiment is shown in FIG. 7A. The user interface screen 700 includes a string input section 705 for displaying the user-specified input string. An insertion point indicator 785 shows the location in the input string where a new character can be added. A character deletion control 710 is also included to enable the user to delete previously entered characters in the input string.

The user interface screen also includes two independently scrollable character selection sections: an alphabetic character selection section 715 and a numeric/symbolic character selection section 720. Each character selection section enables the user to select from a corresponding predefined set of characters. The alphabetic character selection section 715 enables the user to select from the alphabetic characters from "a" to "z". The numeric/symbolic character selection section 720 enables the user to select from numeric characters between "0" and "9", as well as a selection of common symbolic characters (e.g., "@ & / * . , $ ! - { } % + ?"). Due to the small size of the image display 32 (FIG. 3A), only a subset of the corresponding predefined set of characters are displayed in each of the character selection sections at a particular time. The remainder of the characters can be accessed using scrolling operations. This approach solves the problem that, due to the small size of the image display 32, displaying all of the alphabetic characters at the same time on the image display 32 would require that the individual characters be too small to be easily readable by the user.

The user interface screen 700 also includes a control section including selectable controls for terminating the string input operation. The selectable controls include a cancel control 725 and an OK control 730. A selected character section box 735 provides an indication of the currently selected character selection section. Arrow symbols at the left and right ends of the selected character section box 735 provide an indication that the character selection section is scrollable. A selected character 740 is highlighted to indicate the character that can currently be selected for addition to the input string displayed in the string input section 705.

It will be obvious to one skilled in the art that many variations of the user interface screen 700 can be used in accordance with the present invention. The various elements of the user interface screen can be rearranged in position. Furthermore, certain elements can be removed, or additional elements can be added. In some embodiments, there can be more than two independently scrollable character selection sections. For example, there can be both an upper-case alphabetic character selection section and a lower-case alphabetic character selection section. Alternatively, there can be a first alphabetic character selection section having the alphabetic characters from "a" to "m", and a second alphabetic character selection section having the alphabetic characters from "n" to "z". There can also be other variations to the user interface screen 700. For example, there can be a "shift control" in the control section that allows the user to toggle between uppercase characters and lower-case characters.

Returning to a discussion of FIG. 6, an accept string input step 615 is next used to accept user input using the user controls 34 (FIG. 3A) to sequentially select characters to specify the desired text string. In a preferred embodiment, the characters are selected by user manipulation of the up input button 305, the down input button 310, the left input button 315, the right input button 320 and the confirmation input button 325. In particular, the up input button 305 and the down input button 310 are used to select one of the scrollable character selection sections (i.e., the alphabetic character selection section 715 or the numeric/symbolic character selection section 720). The left input button 315 and the right input button 320 are then used to scroll through the predefined set of characters in the selected scrollable character selection section to select a particular character, and the confirmation input button 325 is used to add the selected particular character to the input string displayed in the string input section 705.

In a preferred embodiment, as the user presses the left input button 315 and the right input button 320 to scroll through the set of characters in the selected scrollable character selection section, the set of characters will shift to the left or right accordingly so that the selected character 740 remains in the center of the character selection section. In other embodiments, the selected character 740 moves to the left or right within the character selection section upon activation of the left input button 315 or the right input button 320 until it reaches the side of the character selection section. At that point, the set of characters will shift to the left or the right upon further activation of the left input button 315 or the right input button 320.

Consider the example shown in FIG. 7A where thus far the user has entered the input string "na". If the user desires to enter the input string "name @email.com", the user would press the right input button 320 repeatedly until the letter "m" is positioned to be the selected character 740. In some embodiments, the user can press and hold the right input button 320 in order to advance through the characters at a predetermined rate (e.g., 2 characters/second). The user would then press the confirmation input button 325 to add an "m" to the input string. Next, the user would press the left input button 315 repeatedly until the letter "e" is positioned to be the selected character 740, and would press the confirmation input button 325 to add an "e" to the input string. FIG. 7B illustrates a user interface screen 750 corresponding to the content displayed in the image display 32 at this point.

Since the next character to be added to the input string is a symbolic character ("@"), the user would press the down input button 310 to select the numeric/symbolic character selection section 720, and would press the right input button 320 until the "@" symbol is positioned to be the selected character 740. The user would then press the confirmation input button 325 to add the "@" symbol to the input string. FIG. 7C illustrates a user interface screen 760 corresponding to the content displayed in the image display 32 at this point.

In a similar manner, the user would manipulate the up input button 305, the down input button 310, the left input button 315, the right input button 320 and the confirmation input button 325 to add the characters "email.com" to the input string. FIG. 7D illustrates a user interface screen 770 corresponding to the content displayed in the image display 32 at this point.

The various user controls 34 (FIG. 3A) can also be used to access the other control features shown in the user interface screen 700 (FIG. 7A). For example, the up input button 305, the down input button 310, the left input button 315, the right input button 320 can be manipulated to highlight the character deletion control 710. The confirmation input button 325 can then be pressed to delete the character to the left of the insertion point indicator 785. Similarly, the up input button 305, the down input button 310, the left input button 315, the right input button 320 can be manipulated to highlight the string input section 705. The left input button 315 and the right input button 320 can then be used to move the position of the insertion point indicator 785 within the input string. This enables the user to add or delete characters in the middle of the input string. FIG. 7E shows a user interface screen 780 where the insertion point indicator 785 has been positioned between the "1" and the "." characters.

Returning to a discussion of FIG. 6, an accept string input termination step 620 is used to accept user input terminating the string input operation. There are two ways that the string input can be terminated, by accepting the string input, or by cancelling the string input. As illustrated in FIG. 7F, which shows a user interface screen 790, the string input can be accepted by manipulating the up input button 305, the down input button 310, the left input button 315, the right input button 320 to highlight the OK control 730. The confirmation input button 325 can then be pressed to accept the entered input string 625. The input string 625 can then be saved in a processor-accessible memory (e.g., image memory 30 in FIG. 1) using a store input string step 630 (FIG. 6). Conversely, the user can manipulate the user controls 34 to highlight the cancel control 725 (FIG. 7F). The confirmation input button 325 (FIG. 3A) can then be pressed to cancel the string input operation without storing the input string 625.

The invention has been described in detail with particular reference to certain preferred embodiments thereof, but it will be understood that variations and modifications can be effected within the spirit and scope of the invention.

Parts List 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
32 image display
34 user controls
36 display memory
38 wired interface
40 computer
44 video interface
46 video display
48 interface/recharger
50 wireless modem
52 radio frequency band
58 wireless network
70 Internet
72 photo service provider
90 white balance setting
95 white balance step
100 color sensor data 105 noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 user settings
180 digital image file
185 camera settings
190 environmental attribute readings
300 five-way controller
305 up input button
310 down input button
315 left input button
320 right input button
325 confirmation input button
330 share button
335 delete button
340 review button
345 capture mode button
350 tools button
360 controller ring
365 joy stick
370 up direction
375 down direction
380 left direction
385 right direction
400 select captured video step
405 digital video sequence
410 initiate trimming operation step
415 display instructions step
420 display frame representation step
425 accept user input step
430 confirm trimming selection step
435 provide trimmed video step
440 trimmed digital video sequence
445 stored trimmed video sequence step
500 user interface screen
505 select marker instructions
510 move marker instructions
515 next instructions
520 OK control
525 user interface screen
530 displayed video frame
535 timeline
540 start frame marker
545 end frame marker
550 user interface screen
555 excluded start timeline portion
560 trimmed timeline portion
565 user interface screen
570 user interface screen
575 excluded end timeline portion
580 user interface screen
585 menu choices
590 selection box
605 initiate string input operation step
610 display string input interface step
615 accept string input step
620 accept string input termination step
625 input string
630 store input string step
700 user interface screen
705 string input section
710 character deletion control
715 alphabetic character selection section
720 numeric/symbolic character selection section
725 cancel control
730 OK control
735 selected character section box
740 selected character
750 user interface screen
760 user interface screen
770 user interface screen
780 user interface screen
785 insertion point indicator
790 user interface screen

The invention claimed is:

1. A portable electronic device comprising:
a display;
user controls configured to enable a user to select between at least an up input, a down input, a left input, a right input, and a confirmation input;
a storage memory;
a data processing system; and
a program memory communicatively connected to the data processing system and configured to store instructions configured to cause the data processing system to provide a user-specified input string, wherein the display is configured to display a string input interface wherein the string input interface includes:
a string entry section for displaying the user-specified input string; and
at least two independently scrollable character selection sections, the at least two independently scrollable character selection sections separate from the string entry section, wherein each independently scrollable character selection section enables a user to select from a corresponding predefined set of characters, wherein only a subset of the corresponding predefined set of characters are displayed in each of the at least two independently scrollable character selection sections at a particular time, wherein each of the at least two independently scrollable character selection sections enables scrolling between a plurality of characters within a respective independently scrollable character selection section;
wherein the program memory includes instructions to accept user input provided using the user controls to sequentially select characters to specify the user-specified input string, wherein the up input and the down input are used to select one of the at least two independently scrollable character selection sections, the left input and the right input are used to scroll through the predefined set of characters in the selected independently scrollable character selection section to select a particular character, and the confirmation input is used to add the selected particular character to the input string displayed in the string entry section; and
wherein the storage memory is configured to store the input string.

2. The portable electronic device of claim 1 wherein the string input interface further includes a control section including a selectable control for terminating a string input operation, and wherein the up input and the down input can be used to select the control section, and wherein the confirmation input is used to activate the selectable control for terminating the string input operation.

3. The portable electronic device of claim 2 wherein the control section further includes a cancel control for terminating the string input operation without storing the input string in the storage memory.

4. The portable electronic device of claim 1 wherein the string input interface further includes a character deletion control for deleting a previously entered character in the input string.

5. The portable electronic device of claim 1 wherein the predefined set of characters for one of the at least two independently scrollable character selection sections includes alphabetic characters.

6. The portable electronic device of claim 1 wherein the predefined set of characters for one of the at least two independently scrollable character selection sections includes numeric characters.

7. The portable electronic device of claim 1 wherein the predefined set of characters for one of the at least two independently scrollable character selection sections includes symbolic characters.

8. The portable electronic device of claim 1 wherein the portable electronic device is a digital camera.

9. The portable electronic device of claim 1 wherein the display is not touch sensitive and has a diagonal dimension of less than 2 inches.

10. The portable electronic device of claim 1 wherein the user-specified input string is used to specify an E-mail address, a social networking account identifier, a website URL or an image caption.

11. The portable electronic device of claim 1 wherein the user controls are provided using a five-way controller including an up input button, a down input button, a left input button, a right input button, and a confirmation input button.

12. The portable electronic device of claim 1 wherein at least some of the user controls are provided using a joystick, wherein the joystick is moved in an up direction to provide the up input, the joystick is moved in a down direction to provide the down input, the joystick is moved in a left direction to provide the left input, and the joystick is moved in a right direction to provide the right input.

13. The portable electronic device of claim 1, further comprising a joystick, wherein the joystick is configured to be pressed to provide the confirmation input.

14. A method comprising:
displaying, via a display on a portable electronic device, a string input interface, wherein the string input interface includes:
a string entry section for displaying a user-specified input string; and
at least two independently scrollable character selection sections, the at least two independently scrollable character selection sections separate from the string entry section, wherein each independently scrollable character selection section enables a user to select from a corresponding predefined set of characters, wherein only a subset of the corresponding predefined set of characters are displayed in each of the at least two independently scrollable character selection sections at a particular time, wherein each of the at least two independently scrollable character selection sections enables scrolling between a plurality of characters within a respective independently scrollable character selection section;
accepting user input provided using user controls of the portable electronic device to sequentially select characters from the at least two independently scrollable character selection sections to specify the user-specified input string within the string entry section, wherein the user controls are configured to enable at least an up input, a down input, a left input, a right input, and a confirmation input, and wherein the up input and the down input are configured to enable selection of one of the at least two independently scrollable character selection sections, the left input and the right input are configured to enable scrolling through the predefined set of characters in the selected independently scrollable character selection section to select a particular character, and the confirmation input is configured to enable adding the selected particular character to the user-specified input string displayed in the string entry section; and
storing the user-specified input string in a storage memory.

15. The method of claim 14, further comprising receiving a control input to terminate a string input operation, and wherein the up input and the down input can be used to select the control input, and wherein the confirmation input is used to activate the selectable control for terminating the string input operation.

16. The method of claim 15, wherein the control input further includes a cancel control configured to terminate the string input operation without storing the user-specified input string in the storage memory.

17. A non-transitory computer-readable medium having instructions stored thereon that, upon execution by a computing device, cause the computing device to perform operations comprising:
presenting a string input interface, wherein the string input interface includes:
a string entry section for displaying a user-specified input string; and
at least two independently scrollable character selection sections, the at least two independently scrollable character selection sections separate from the string entry section, wherein each independently scrollable character selection section enables a user to select from a corresponding predefined set of characters, wherein only a subset of the corresponding predefined set of characters are displayed in each of the at least two independently scrollable character selection sections at a particular time, wherein each of the at least two independently scrollable character selection sections enables scrolling between a plurality of characters within a respective independently scrollable character selection section;
receiving user input provided using user controls to sequentially select characters to specify the user-specified input string, wherein the user controls are configured to enable at least an up input, a down input, a left input, a right input, and a confirmation input, and wherein the up input and the down input are configured to enable selection of one of the at least two independently scrollable character selection sections, the left input and the right input are configured to enable scrolling through the predefined set of characters in the selected independently scrollable character selection section to select a particular character, and the confirmation input is configured to enable adding the selected particular character to the input string displayed in the string entry section; and
storing the user-specified input string in a storage memory.

18. The non-transitory computer-readable medium of claim 17, further comprising receiving a control input to terminate a string input operation, and wherein the up input and the down input can be used to select the control section, and wherein the confirmation input is used to activate the selectable control for terminating the string input operation.

19. The portable electronic device of claim 1, wherein a first of the at least two independently scrollable character selection sections is separate from a second of the at least two independently scrollable character selection sections.

20. The portable electronic device of claim 1, wherein a first of the at least two independently scrollable character selection sections comprises only alphabetic characters, and wherein a second of the at least two independently scrollable character selection sections does not include alphabetic characters.

21. The portable electronic device of claim 1, wherein the string entry section and the at least two independently scrollable character selection sections are arranged in a non-overlapping arrangement such that none of the string entry section and the at least two independently scrollable character selection sections overlap another of the string entry section and the at least two independently scrollable character selection sections.

22. The portable electronic device of claim 1, wherein the at least two independently scrollable character selection sections extend horizontally to allow horizontal scrolling through individual characters.

* * * * *